United States Patent [19]

Shim

[11] Patent Number: 5,421,247
[45] Date of Patent: Jun. 6, 1995

[54] REFRIGERATOR INCLUDING A FERMENTING COMPARTMENT AND TEMPERATURE CONTROL METHOD THEREOF

[75] Inventor: Jae E. Shim, Suwon, Rep. of Korea

[73] Assignee: Samsung Electronics Co., Ltd., Suwon, Rep. of Korea

[21] Appl. No.: 202,077

[22] Filed: Feb. 25, 1994

[30] Foreign Application Priority Data

Feb. 26, 1993 [KR] Rep. of Korea .................. 93-2856

[51] Int. Cl.[6] ............................ C12H 1/00; A23B 4/00
[52] U.S. Cl. ....................................... 99/468; 99/483; 435/291; 435/289
[58] Field of Search ................ 99/467, 468, 470, 472, 99/483, 331, 276, 451, 506, 486, 493; 435/289, 290, 291, 316, 313; 426/615, 52, 49; 62/197, 198, 117

[56] References Cited

U.S. PATENT DOCUMENTS

| | | | |
|---|---|---|---|
| 4,318,992 | 3/1982 | Mila-de-la-Roca et al. | 435/291 |
| 5,142,969 | 9/1992 | Chun | 99/468 |
| 5,228,499 | 7/1993 | Yoon | 165/2 |

*Primary Examiner*—David A. Scherbel
*Assistant Examiner*—Reginald L. Alexander
*Attorney, Agent, or Firm*—Burns, Doane, Swecker & Mathis

[57] ABSTRACT

A refrigerator includes a fermentation compartment having a heater and a cooler. A food container is inserted into the compartment for fermenting food. The container includes a power source, a detector, and a radio transmitter. The detector detects fermentation conditions within the container. That detected information transmitted by the transmitter as radio signals which are received by a controller of the refrigerator which controls the temperature in the fermentation compartment in accordance with the received information. If the power source in the container becomes insufficiently charged, an indicator lamp on the refrigerator is energized.

20 Claims, 12 Drawing Sheets

REFRIGERATOR INCLUDING A FERMENTING COMPARTMENT AND TEMPERATURE CONTROL METHOD THEREOF

BACKGROUND OF THE INVENTION

This invention relates to a refrigerator including a fermenting compartment and a temperature control method therefore, particularly to a refrigerator which detects the temperature, the pH concentration, the $CO_2$ concentration and the gas pressure of fermented foods inside the food container placed in the fermenting compartment, transmits this detected data to the refrigerator control portion which controls the conditions in the food container in the fermenting compartment according to the data and stores the fermenting foods container thereafter.

In general, as shown FIG. 1 and FIG. 2, a refrigerator controls the temperature in the refrigerator by turning on and off a compressor depending on the setting of a thermostat 4. Because a temperature sensing tube 3 is mounted on an evaporator 1 or a refrigerating compartment 2, when the temperature of the evaporator 1 or the refrigerating compartment 2 reaches a predetermined temperature, the compressor stops and the refrigerator also stops.

Over a time period, when the temperature of the evaporator 1 and the refrigerating compartment 2 rises, the pressure in a diaphragm 5 also rises. Accordingly, when the compartment reaches the predetermined temperature, the contact point 6 is moved into contact with the other contact point and the compressor begins to operate. The time required to turn on and off the compressor varies based on strength of an adjustable spring 7. When an user rotates the cam 9 by adjusting the dial handle 8, the position of an adjusting lever 11 is changed. The elastic strength of the adjusting spring 7 varies according to changes in the lever's position, so that its strength is adjusted. The refrigerator described above merely stores foods which have been fermented in another apparatus and it does not include a food fermenting apparatus.

Thus, in order to ferment and store fermented foods such as kimchi (Korean pickled vegetables) in the refrigerator, the refrigerator as described above is provided with a fermenting compartment which includes a door and heaters at the top and the bottom surfaces of the compartment to maintain the proper fermenting temperature. Here, because an insulating wall is provided between the fermenting compartment and the other compartments, the warm air generated in the fermenting compartment does not affect the other compartments. Also, the fermenting compartment includes coolant pipes at the left, right and rear interior walls in order to store the fermented foods after the fermenting process is finished and thus the fermenting compartment is maintained at a storing temperature by circulating the coolant through the pipes.

The refrigerator of FIGS. 1 and 2 is operated at a predetermined temperature without regarding various temperature changes necessary for fermenting and storing foods. Because it takes some time for the thermal energy generated in the fermenting compartment to influence the fermented foods in the storage container, the temperature between the storage container and the fermenting compartment may be different. Therefore, even if the temperature in the fermenting compartment is proper to the fermenting condition, but the temperature in the storage container might not be proper. Due to the above mentioned reason, the fermentation process of the stored foods may not be accurately controlled.

In order to solve the problem, a prior art container including an apparatus detecting the various fermentation conditions is placed in the fermenting compartment of the refrigerator and controls the temperature in the container depending on the detected data.

When that prior art container is used to control the fermenting process and is put in the fermenting compartment after the fermenting process, various data communication lines (hereinafter "lines") between the container and the refrigerator are provided so that the fermentation and storage condition data, for example temperature, hydrogen ion concentration, $CO_2$ concentration and gas pressure and the like, may be transmitted on the lines to the refrigerator control mechanism.

At this time, the above described prior art container and refrigerator has a disadvantage in that, when the container is moved so that the interior of the refrigerator can be cleaned as necessary, the electrical lines hinder the movement of the container and the cleaning of the refrigerator.

Accordingly, the present invention was invented in order to solve the problems.

One object of the present invention is to enable a refrigerator to detect the fermentation conditions and control accurately the temperature in the storage container according to the detected data.

Another object of the present invention is to supply the refrigerator with an apparatus for radio-communicating data between the container and refrigerator control portion.

SUMMARY OF THE INVENTION

In order to achieve the above objects, a refrigerator according to the present invention includes the fermenting compartment with the temperature controlled therein, the storage container which is placed in the fermenting compartment and used for storing fermented foods therein, a detector for detecting the fermenting conditions in the storage container, a transmitter for sending the fermentation data detected by the detection portion and mounted on the storage container, a receiver portion for receiving the fermentation data sent from the transmitter, and a refrigerator controller for controlling the refrigerator according to the fermentation data.

DETAILED DESCRIPTION OF A PREFERRED EMBODIMENT OF THE INVENTION

An embodiment of the present invention is now described in detail below with reference to the drawings.

Figure 2:
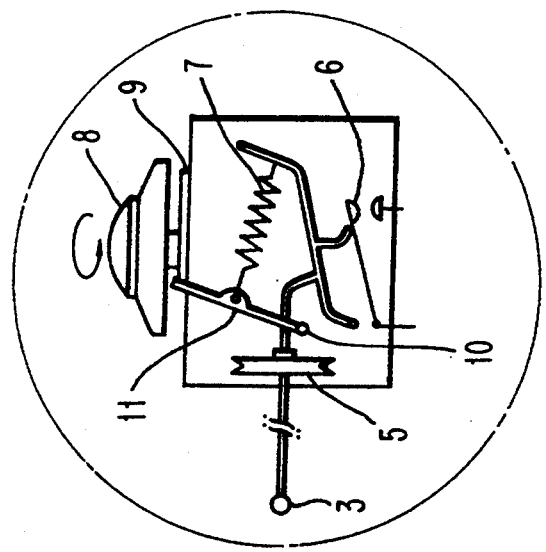
FIG. 2 is a detailed drawing of the circled in FIG.1.
Figure 1:
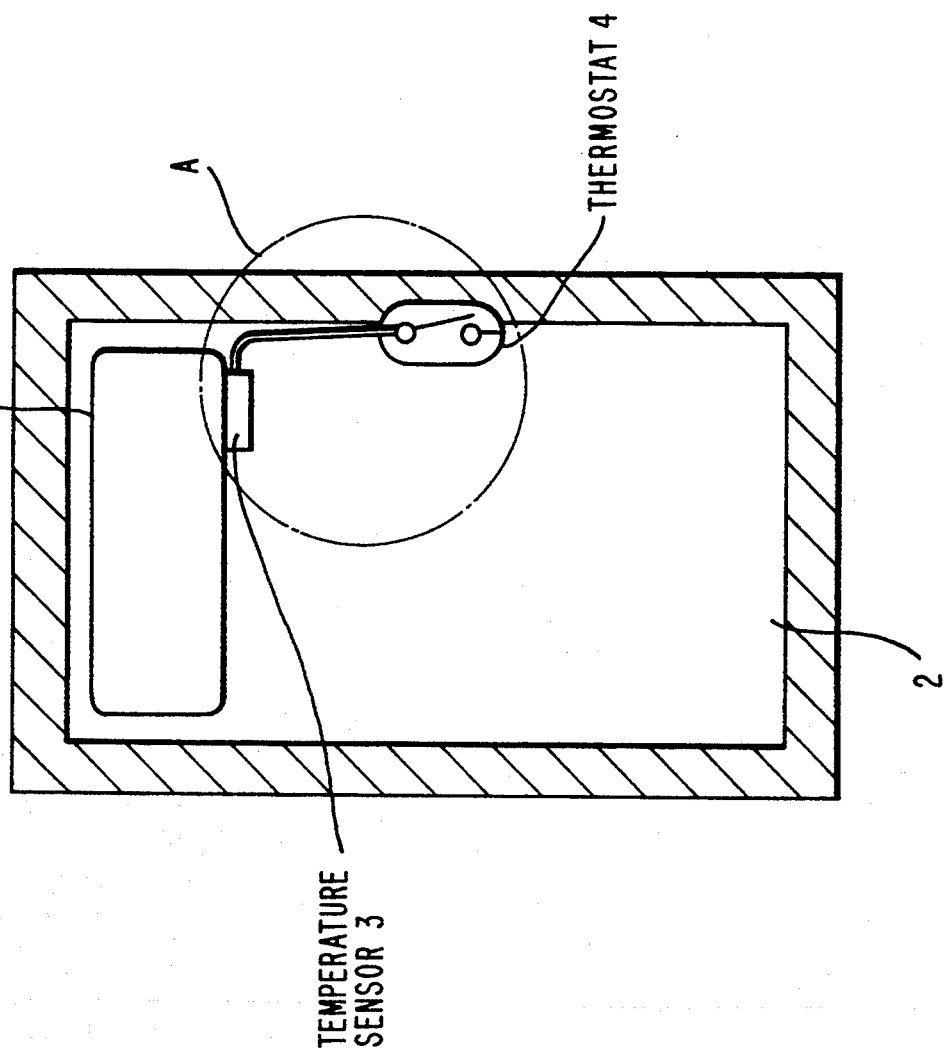
FIG. 1 is a sectional view of a conventional refrigerator.
Figure 3:
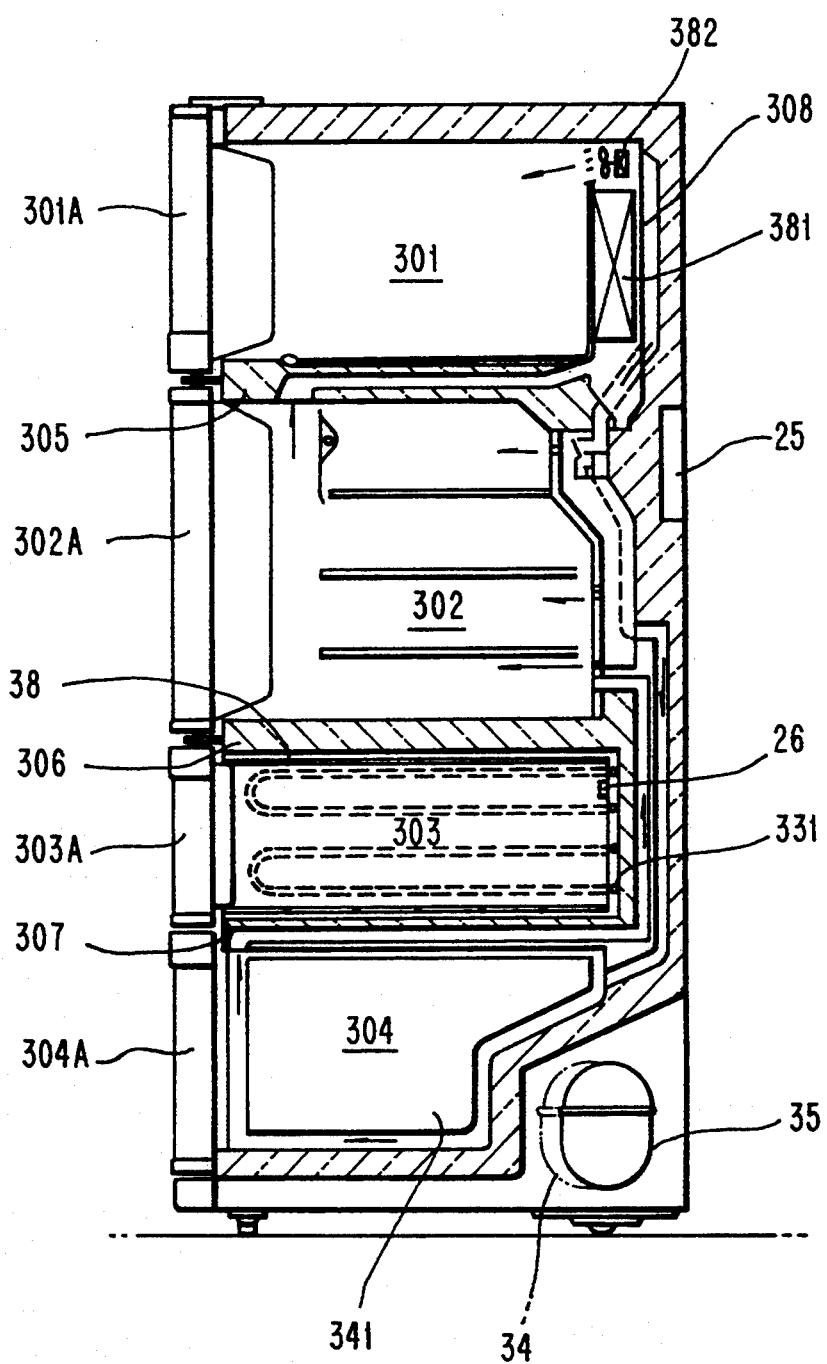
FIG. 3 is a sectional view of the refrigerator according to the present invention.

FIG. 3 is a sectional view of the refrigerator according to the present invention. The refrigerator includes, sequentially from top to bottom, a freezing compartment 301, a refrigerating compartment 302, a fermenting compartment 303 and a vegetable storage compartment 304. A pair of doors 301A and 302A are provided on the front side of the freezing compartment 301 and the refrigerating compartment 302 which opens or closes on hinges on both sides. The fermenting compartment 303 includes a door 303A which is hinged on the third middle wall 307, opens and closes in a forward and backward direction respectively. The vegetable compartment 304 includes a vegetable storage box 341 in the shape of a drawer. At the front side of the vegetable box 341 is a door 304A which either covers or exposes the vegetable compartment 304.

Mounted in the refrigerator is a first wall 305 between the freezing compartment 301 and the refrigerator compartment 302, a second wall 306 between the refrigerating compartment 302 and the fermenting compartment 303 and a third wall 307 between the fermenting compartment 303 and the vegetable compartment 304. A heat-exchanging compartment 308 is formed in the rear wall and is connected to the freezing compartment 301, the refrigerating compartment 302 and the vegetable compartment 304 via ducts used for air circulation. An evaporator 381 and a freezing fan 382 for blowing air into the freezing compartment 301 are also provided.

The fermenting compartment 303 includes a second evaporator 331 consisting of tubes placed on both side walls and the rear wall, and a second heater 38 consisting of wires placed in the top and the bottom. The second evaporator 331 cools the fermenting compartment 303 with the refrigerant circulated in its interior by a second compressor 35, so it refrigerates the stored foods (for example, kimchi) in the fermenting compartment 303. A receiver 26 is built into the rear wall of the fermenting compartment 303 and it receives radio signals from the storage container. A refrigerator controller 25 is mounted in the rear wall of the refrigerating compartment 302 and it controls all of the operations of the refrigerator.

Figure 4:
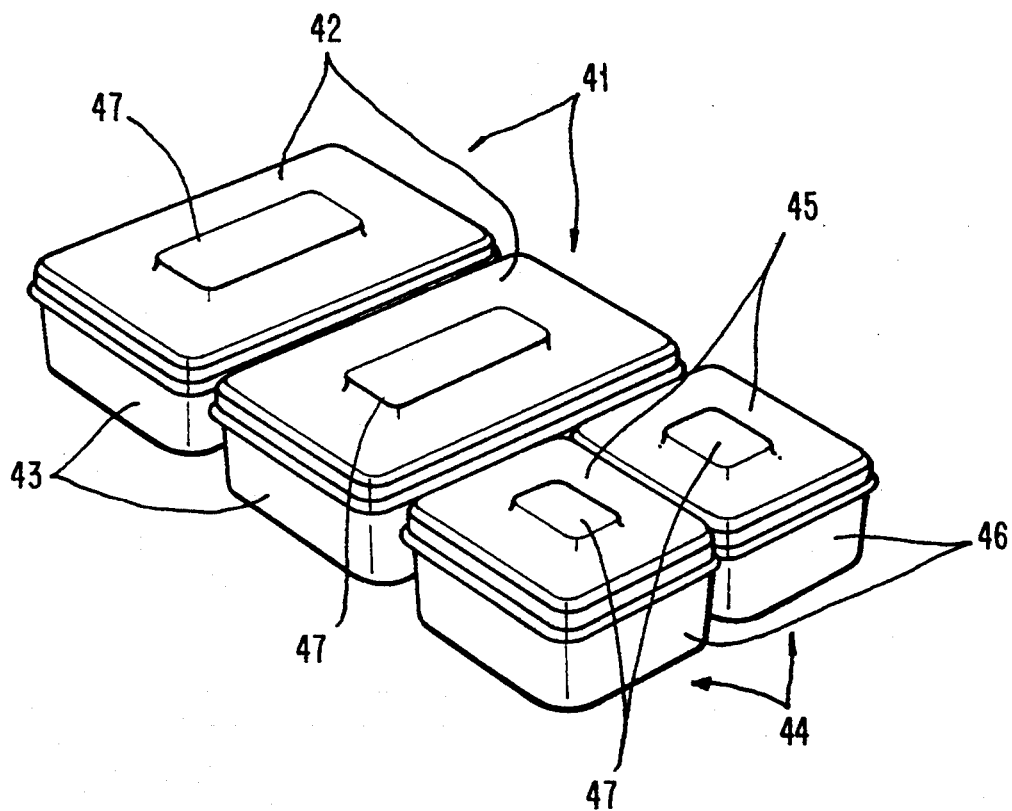
FIG. 4 is a perspective view showing the storage containers according to the present invention.
Figure 5:
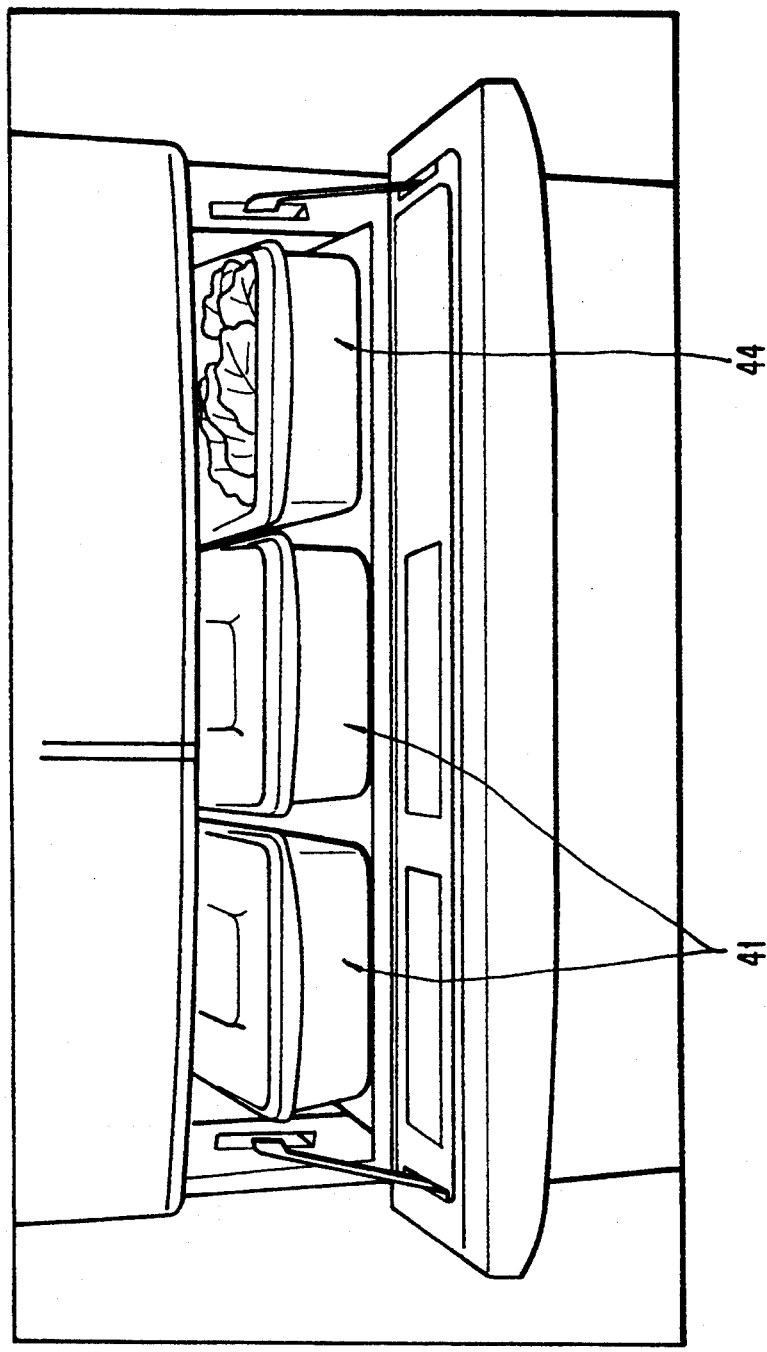
FIG. 5 is a perspective view showing the storage containers put in the fermenting compartment.

FIG. 4 is a perspective view showing the storage containers according to the present invention. A pair of large size storage containers 41, 41 and a pair of small size containers 44, 44 are shown in FIG. 4. A set of containers, which consist of two in small size and two in large size, in the fermenting compartment 303 are shown in FIG. 5. The containers 41, 44 consist of lids 43, 45 and storage tub 43, 46. The lids 42, 45 cover the storage tubs 43, 46, so that they form closed spaces respectively. A control compartment 47 is formed in the center of each of the lids 42, 45. In the control compartment 47 are mounted a storage container control portion 22, a transmitting portion 23, a power portion 24 and an antenna 39a (referring to FIG. 7).

Figure 6:
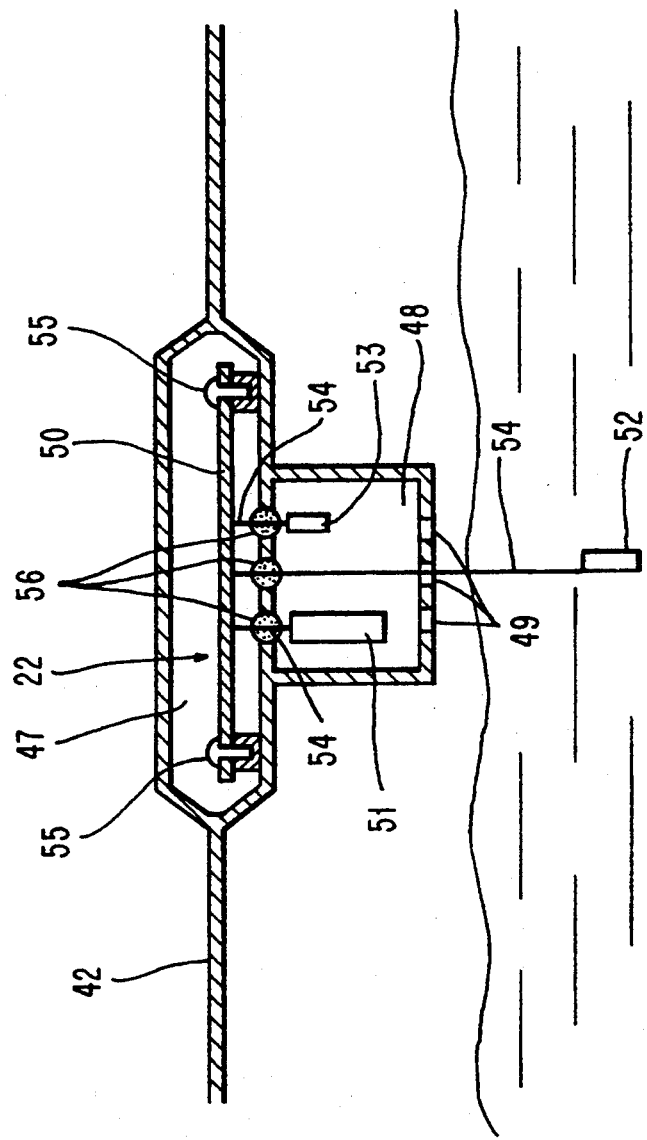
FIG. 6 is a fragmentary sectional view through the lid of the storage container.

FIG. 6 is a sectional view lengthwise through the lid of the storage container and shows the interiors of the control compartment 47 and the detection compartment 48. The storage container control portion 22 includes various elements soldered on a PCB(Printed Circuit Board) 50 and electrically connected to one another by a conducting adhesive such as solder, so that they input and output electrical signals. To the bottom of the PCB are attached conducting wires. Other ends of the conducting wires are electrically connected to a gas pressure sensor 51, a hydrogen ion concentration sensor 52 and a temperature sensor 53 respectively. The PCB is fixed to the bottom of the control compartment 47 by screws 55, 55. Below the bottom of the control compartment 47 is formed a detecting compartment 48. A number of pores 49, 49, 49 are formed on the bottom of the detecting compartment 48. A conducting wire 54 connecting between the hydrogen ion concentration 52 and the PCB 50 passes through one of the pores. The gas pressure sensor 51 and the temperature sensor 53 are mounted in the detecting compartment 48. The conducting wires 54, 54 and 54 connected between each sensor and the PCB pass through the pores 49, 49, 49 formed in the bottom of the control compartment 47. Because the pores are sealed up with sealing material 56. The leakage of moisture and the like generated 64 fermented foods is blocked. Because the hydrogen ion concentration sensor 52 detects the hydrogen ion concentration in the liquid of the fermented foods, it connects to the PCB 50 via the conducting wire 54 which extends to the inside of the fermented foods through the detecting compartment 48 and is submerged in the liquid of the fermented foods. Also, the conducting wires 54, 54 and 54 are covered with non-corrodible material, so that they are not corrodible despite contact with moisture and organic acids. Although $CO_2$ concentration sensor is not drawn in FIG. 6 and described here, it is able to be mounted as the above described sensors. If necessary, other sensors in addition to the above sensors are able to be mounted as above described.

Figure 7:
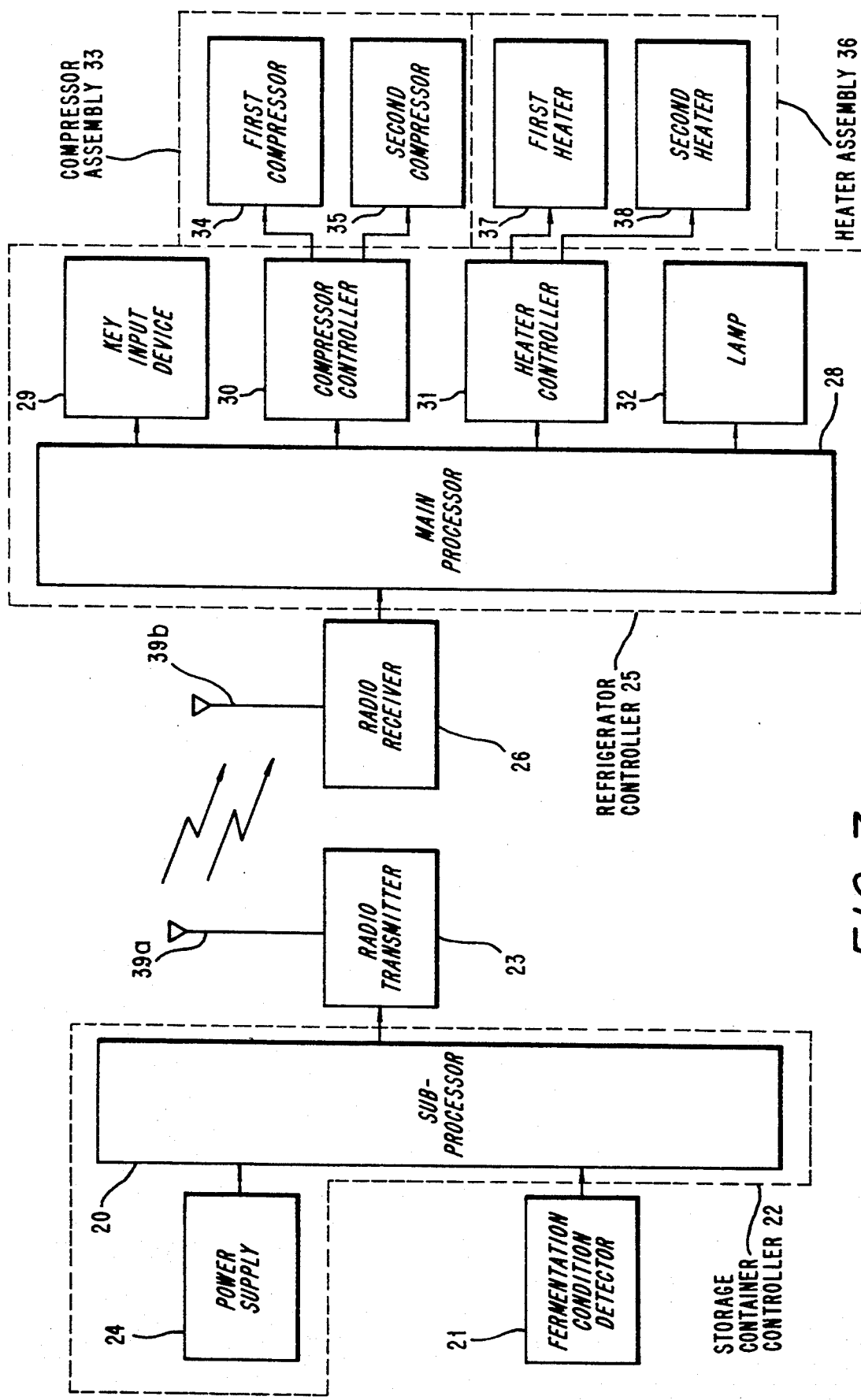
FIG. 7 is a block diagram of the apparatus controlling the refrigerator according to the present invention.

FIG. 7 is a block diagram of the refrigerator control apparatus according to the present invention. Numeral 21 indicates a detection unit which includes the detectors for detecting temperature, hydrogen ion concentration, $CO_2$ concentration and gas pressure and the like generated by the fermented foods. The storage container control portion 22 is mounted in the lid of the storage container and wirelessly transmits the fermentation condition data detected by the detection unit by means of a radio transmitter 23. The receiver portion 26 receives the fermentation condition data sent by radio waves from the storage container controller 22. The refrigerator control portion 25 controls the compressor portion 33 and the heating portion 36 in order to control the temperature in the fermenting compartment 303 according to the fermentation condition data such as temperature, hydrogen ion concentration, $CO_2$ concentration and gas pressure and the like.

The storage container controller 22 consists of a subprocessor 20, a power supply 24 supplying the regulated voltage, the transmitter 23 for transmitting the fermentation condition data modulated with high frequency waves and an antenna 39a for emitting the radio signal. Here, the antenna 39a is a part of the copper plate attached to the PCB (Printed Circuit Board) of the storage controller portion 22.

The refrigerator control portion 25 consists of a main processor 28 for controlling the operation of the refrigerator, a key input device 29 for transmitting to the main processor 28 the commands selected by the user, a compressor controller 30 for controlling the compressor assembly 33 including a first compressor 34 and a second compressor 35 according to the control signals outputted from the main processor 28, a heat controller 31 for controlling the heating assembly 36 including a first heater 37 for defrosting and a second heater 38 for fermenting, and a power lamp 32 turned on and off according to the voltage level of the power portion 24 in the storage container controller 22.

The refrigerator control method according to the present invention is described in detail with reference to the FIG. 8(A) and 8(B) and FIG. 9(A)–9(D) below.

Figure 8A:
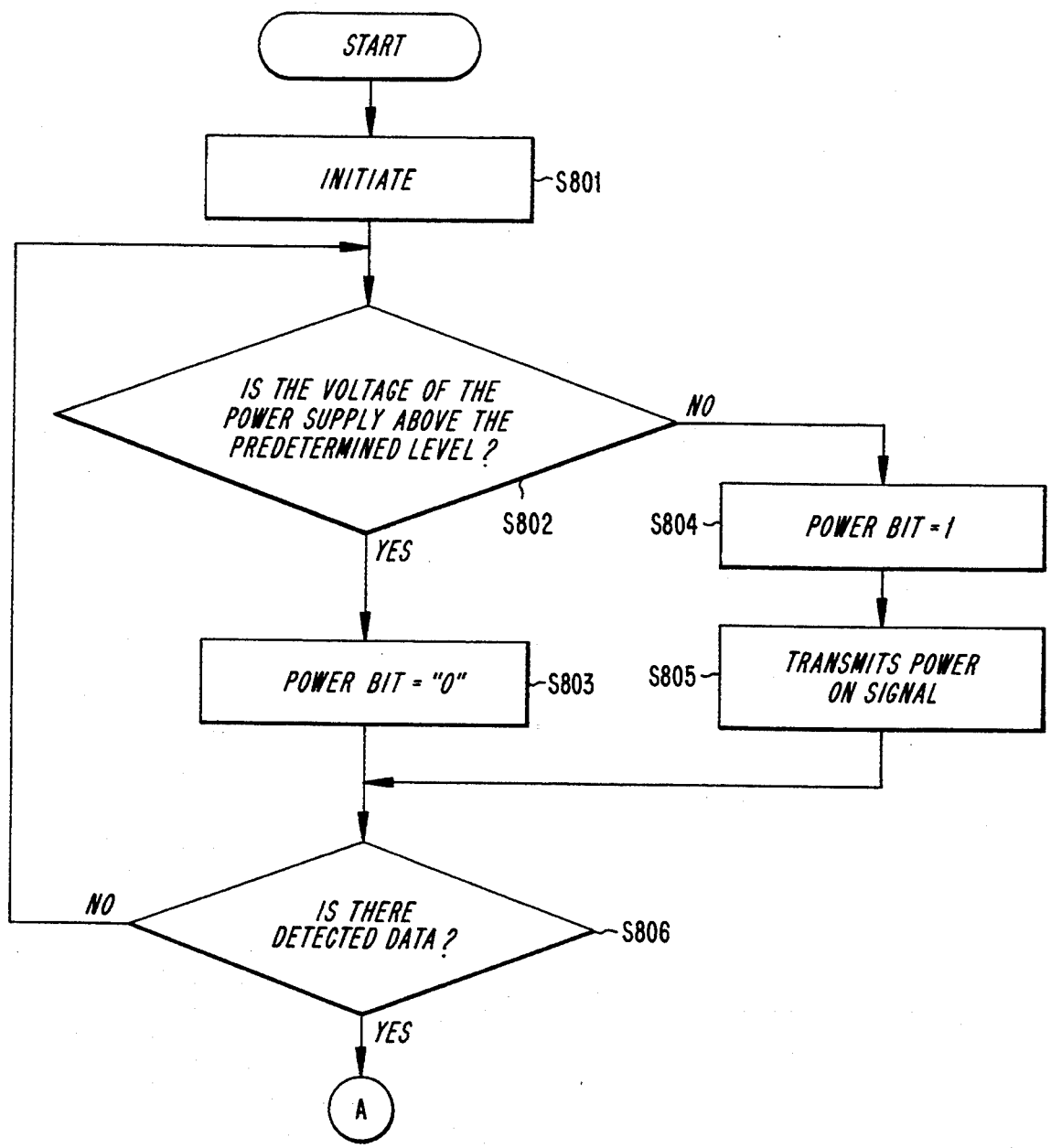
FIG. 8(A) and 8(B) are a flow chart showing the process executed by the storage container controller according to the present invention.
Figure 8B:
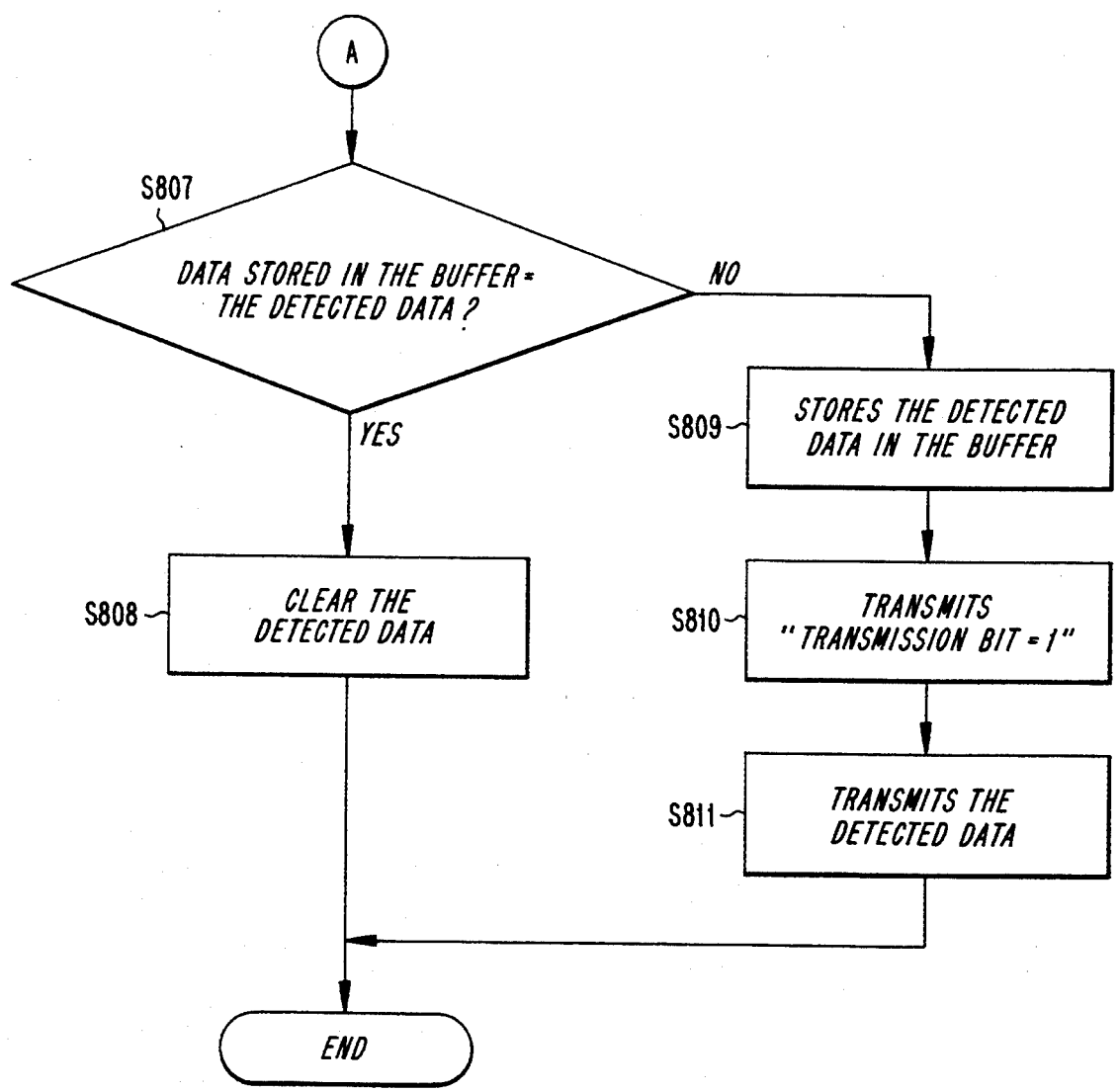
Figure 9A:
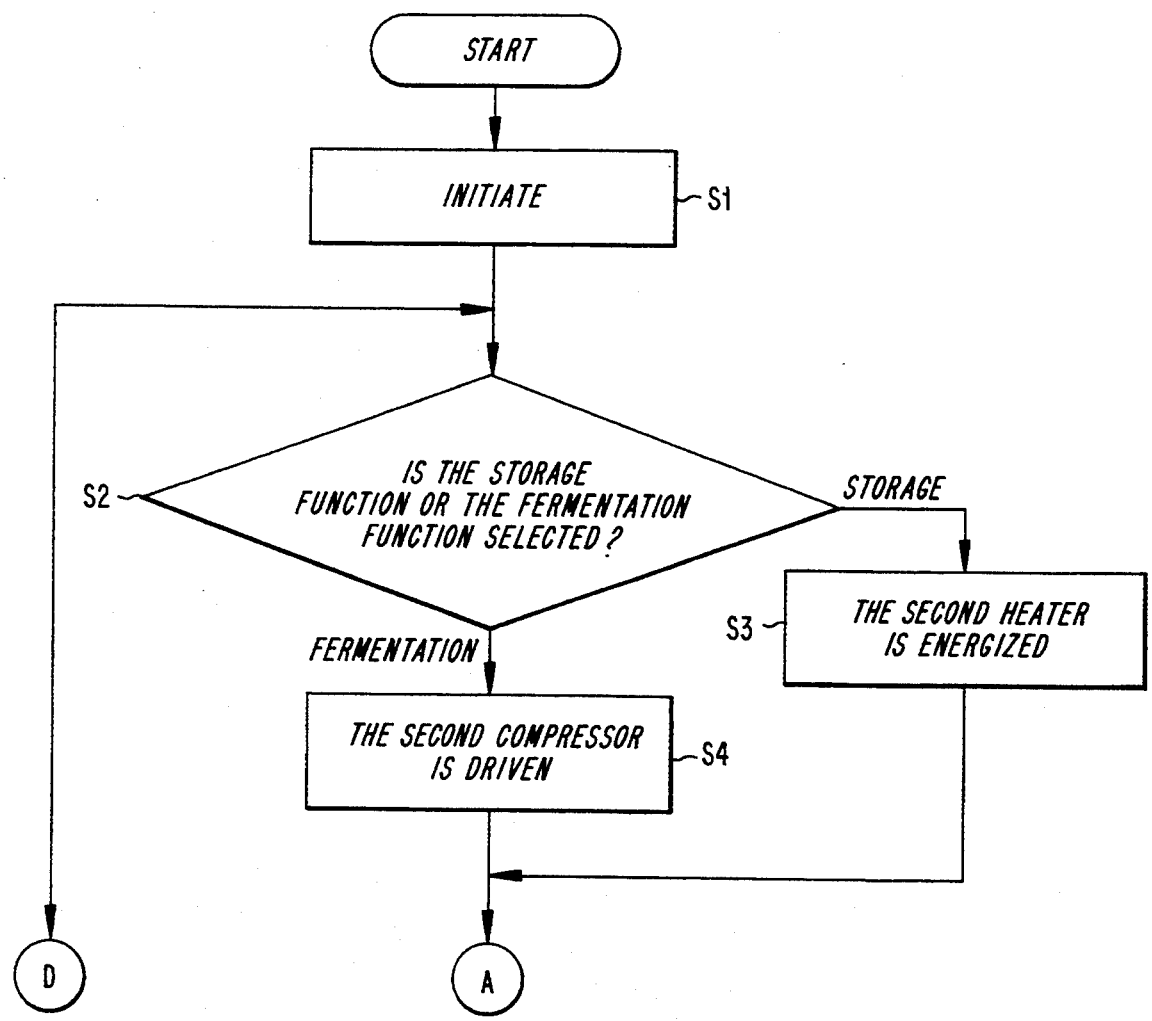
FIG. 9(A)–9(D) are a flow chart showing a method in which the refrigerator control portion controls the temperature in the fermenting compartment according to the present invention.
Figure 9B:
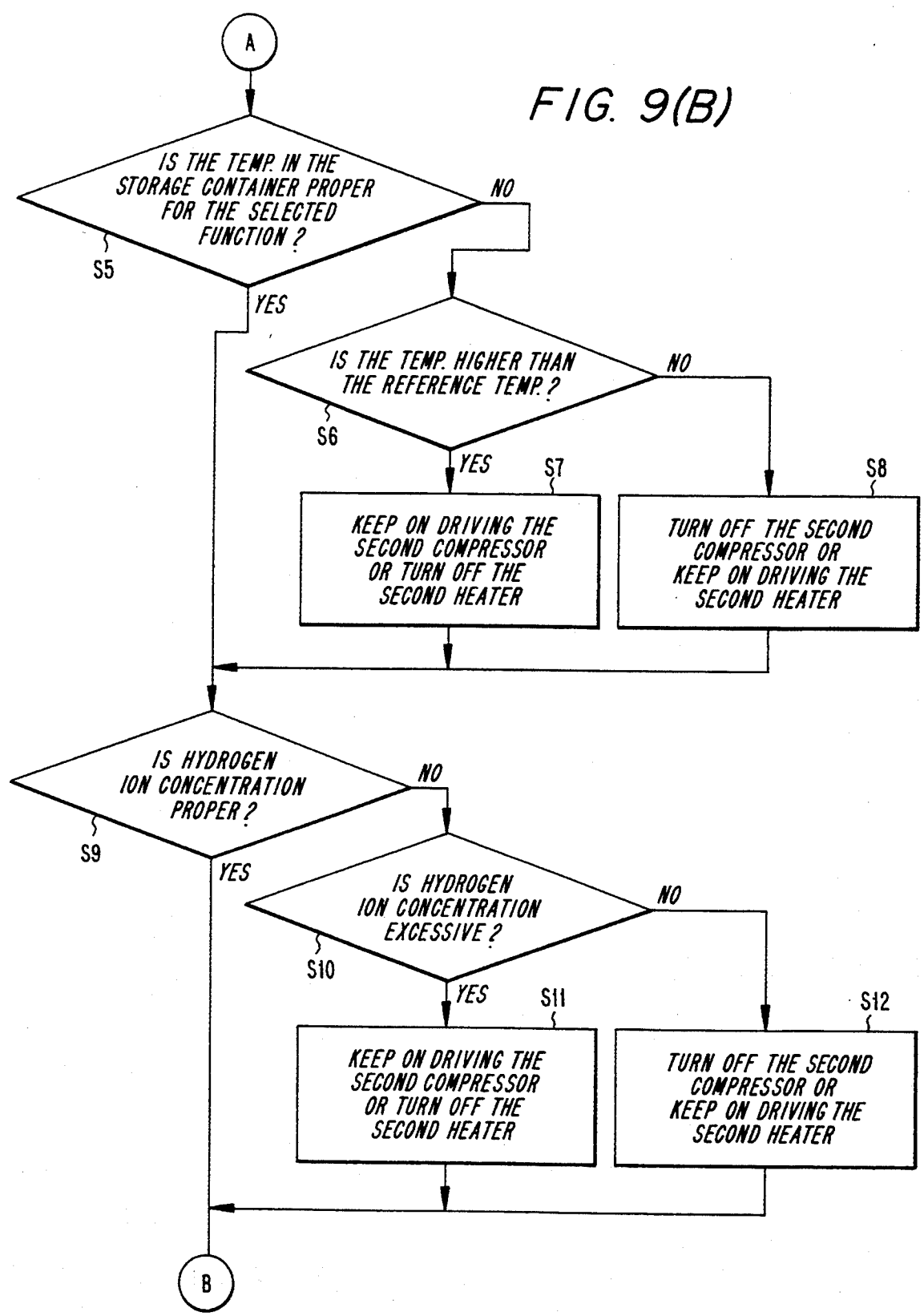
Figure 9C:
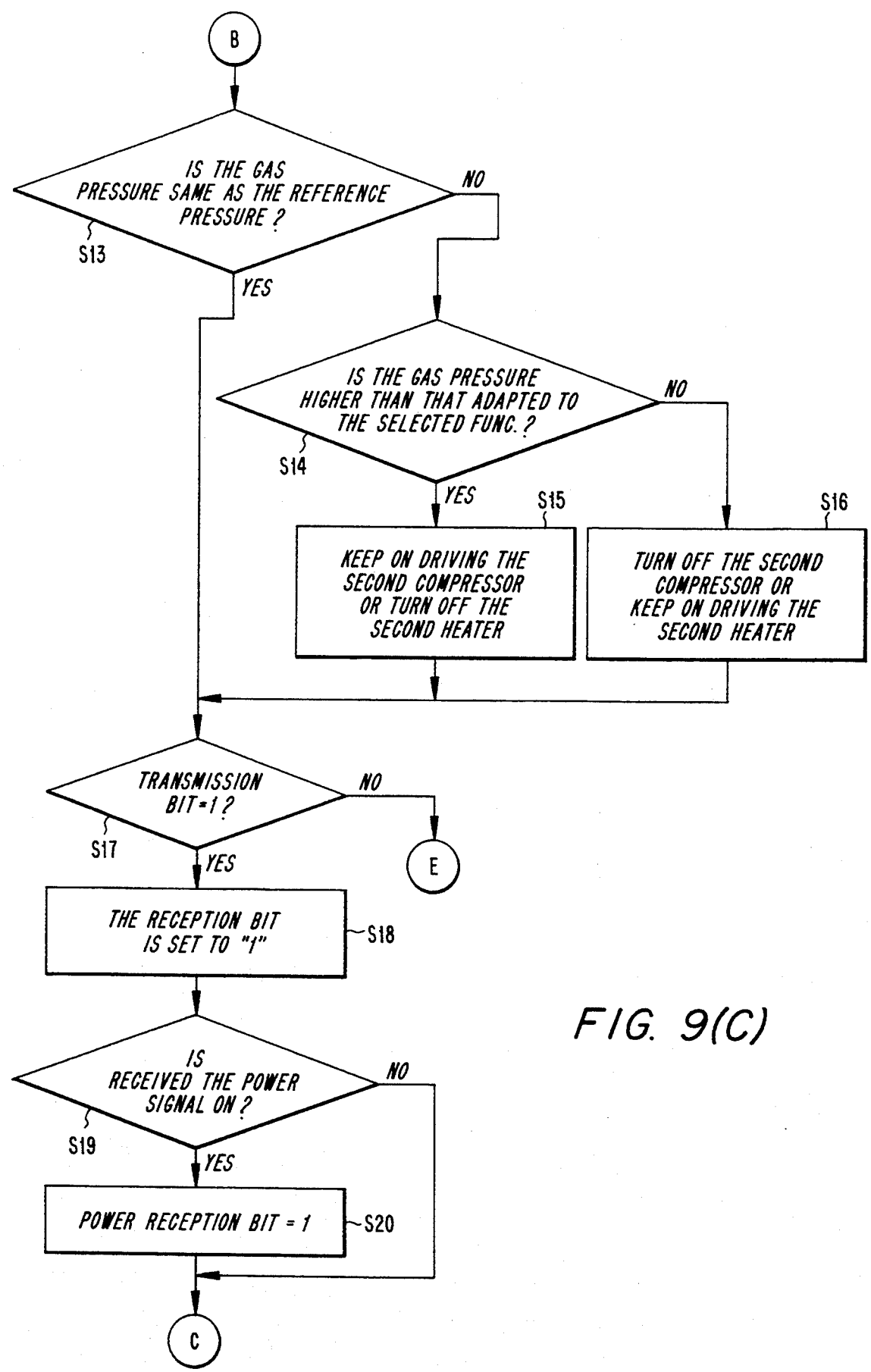
Figure 9D:
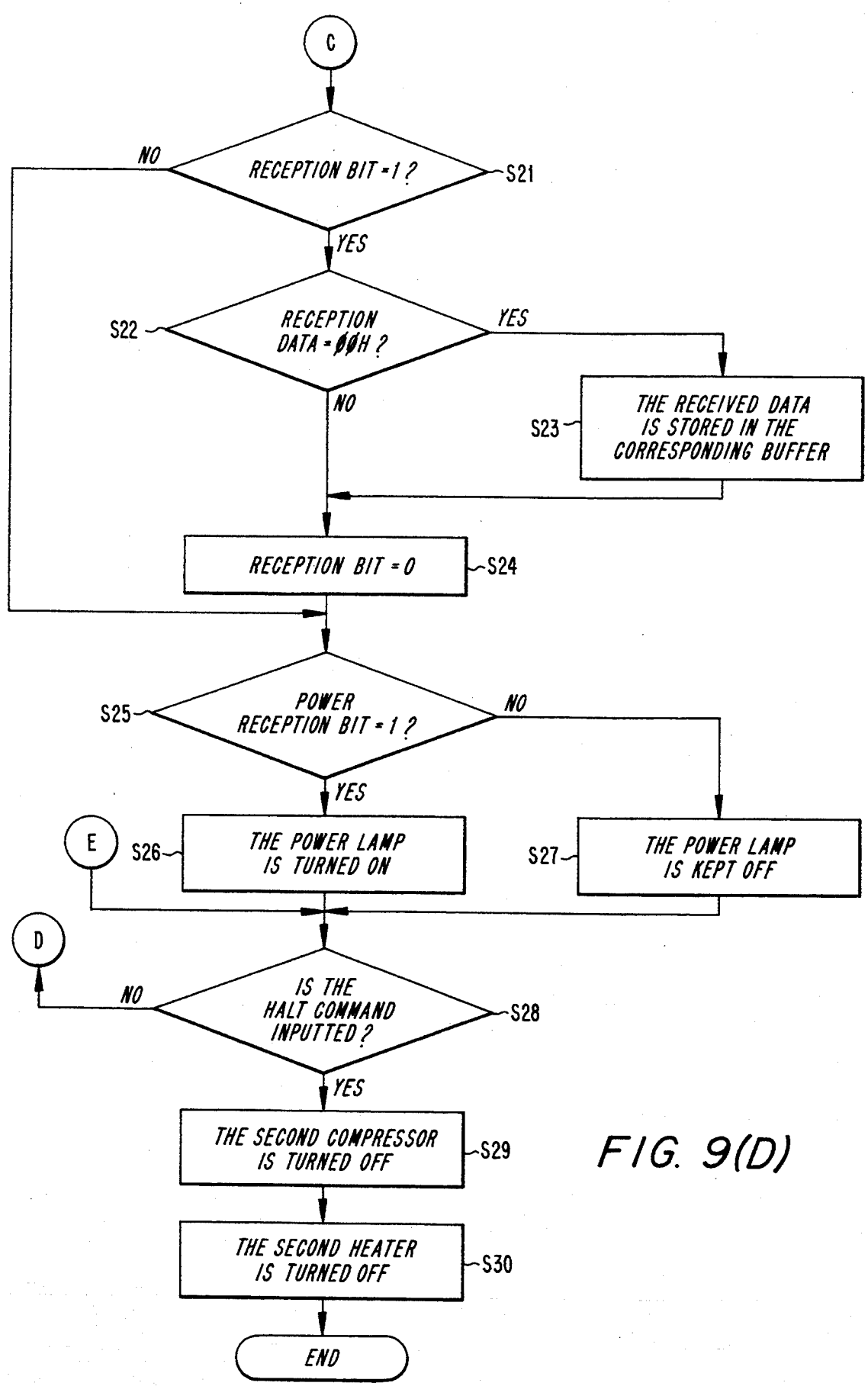

FIG. 8(A) and 8(B) together form a flow chart showing the process executed by the storage container controller 22 according to the present invention. In step S801, the initializing process is performed after the power is turned on. In step S802, when the voltage from the power source 24 exceeds a predetermined level, the process proceeds to step S803. In step S803, the power bit is cleared in order to store the condition where the power source 24 is in the charging state and the storage container controller 22 does not send the signal indicating the state of power to the refrigerator controller 25. When the voltage is not above the predetermined level, in step S804, the power bit is set to "1" in order to store the condition that the power source 24 is not at a sufficient charging state. The storage container controller 22 sends the "power on" signal to the refrigerator controller 25 in order to inform it of the power level state.

In step 806, it is determined whether detected air quality data exists. When detected data does not exist, the process returns to step S802. When the detected data exists, in step S807, it is determined whether or not it is equal to the data previously stored in the buffer. When the detected data is equal to the previously recorded data, in step S808, the detected data is cleared and the program ends. When the detected data is not equal to the previous data, it is stored in the buffer(step S809), and the radio signal indicating "transmission bit =1" and the detected data are sent to the refrigerator controller 25 (step S810 and step S811). Thereafter, the program ends.

The fermenting compartment control method according to the present invention is described in detail with reference to FIG. 9(A)–9(D) below.

In step S1, the initializing process is performed after the power is turned on. At this time, the other compartments (except the fermenting compartment 303) are controlled. However, because that control is readily enough known to a skilled man in the art related to the present invention, the description of that control is abbreviated and only the control method of the fermenting compartment is described herein. In step S2, it is determined whether the function selected by the user via the key input device 29 is a storage function or a fermentation function. When the fermentation function is selected, in step S3, the second heater 38 is energized, so that the fermenting compartment 303 is heated to supply the thermal energy necessary for the fermentation process. When the storage function is selected, in step S4, the second compressor 35 is operated so that low temperature and high pressure refrigerant is directed through the second evaporator 331, so that the fermenting compartment 303 is cooled to remove thermal energy from the foods in the storage container.

In step S5, it is determined whether the temperature in the storage container is proper for the selected function (fermentation function or storage function). Data sensed by the temperature sensor 53 provided in the storage container is transmitted by radio waves from the transmitter 23 and the transmitting antenna 39a. After the refrigerator controller 25 receives the data via the receptor 26, it controls this process.

When the temperature in the storage container 41, 44 is proper for the selected function, the process proceeds to step S9. When it is not proper, in step S6, it is determined whether the temperature in the storage container 41, 44 is higher than the required (i.e., reference) temperature. When the answer is "yes", the process proceeds to step S7. In step S7, when the fermenting compartment 303 is operated in the storage function, the second compressor 35 is continuously operated, or when the fermenting compartment 303 is operated in the fermentation function, the second heater 38 is turned on. When the answer is "no", the process proceeds to step S8. In step S8, when the fermenting compartment 303 is operated in the storage function, the second compressor 35 is turned off, or when it is operated in the fermentation function, the second heater is continuously operated.

In step S9, it is determined whether the hydrogen ion concentration in the fermentation liquid is proper. At this time, the hydrogen ion concentration in the storage container 41, 44 is detected by the hydrogen ion concentration sensor 52 of the detection portion 21, and the data is sent by radio waves from the transmitter 23 and the receptor 26 as described in the temperature control steps. When the answer is "yes", the process proceeds to step S13. When the answer is "no", the process proceeds to step S10. In step S10, it is determined whether the hydrogen ion concentration is excessive. When the answer is "yes" in step S10, the process proceeds to step S11. In step S11, when the fermenting compartment 303 is operated in the storage function, the second compressor 35 is continuously operated, or when it is operated in the fermentation function, the second heater 38 is turned off. Accordingly, when the answer is "no" in step S10, the process proceeds to step S12. In step S12, when the fermenting compartment 303 is operated in the storage function, the second compressor 35 is turned off, or when it is operated in the fermentation function, the second heater 38 is continuously operated.

In step S13, it is determined whether the gas pressure in the storage container is proper. Also, in this process, the gas pressure data are transmitted by radio waves from the transmitter portion 23 and the reception portion 26 as described in the previous temperature and hydrogen ion concentration control. When the gas pressure is proper, the process proceeds to step S17. When the gas pressure is not proper, the process proceeds to step S14. In step S14, it is determined whether the gas pressure is higher than that adapted to the selected function. When the answer is "yes" in step S14, the process proceeds to step S15. In step S15, when the fermenting compartment 303 is operated in the storage function, the second compressor 35 is continuously operated, or when it is operated in the fermentation function, the second heater 38 is turned off, and then the process proceeds to step S17. When the answer is "no" in step S14, the process proceeds to step S16. In step S16, when the fermenting compartment 303 is operated in the storage function, the second compressor 35 is turned off, or when at is operated in fermentation function, the second heater 38 is continuously turned on, and then the process proceeds to step S17. Here, the process for detecting the $CO_2$ concentration is performed in addition to this program and the description of this process is abbreviated due to being the same as the process for controlling the refrigerator according to the temperature, hydrogen ion concentration and gas pressure data.

In step S17, it is determined whether the transmission bit of input data received through the receptor 26 is "1" (see step S810). When the answer is "no", the process proceeds to step S28. When the answer is "yes", in step S18, the reception bit in the main processor 28 is set at "1" in order to store the fact that received data exists in the receptor 26, and then the process proceeds to step S19. In step S19, it is determined whether the refrigerator controller 25 is receiving the power "on" signal indicating that the power source 28 is not enough for the charging state (see step S805). When the power "on" signal is not received, the process proceeds to step 21. When the power "on" signal is received, in step 20, the power reception bit, the bit indicating that the power "on" signal is received, is set to "1", and then the process proceeds to step S21.

In step S21, it is determined whether the data is received by the receptor 26 by determining whether the reception bit is set at "1". When the reception bit is not at "1", the process proceeds to step S25. When the reception bit is set at "1", in step S22, it is determined whether the received data exists by determining whether or not the received data are set at "00H (hexadecimal 00)". When the received data is not "00H", in step 23, the received data is stored in the corresponding buffer. When the received data is "00H", in step S24, the reception bit indicating that the data has not been received through the reception portion 26 is reset at "0".

In step S25, it is determined whether the power reception bit is set at "1". When "power reception bit=1", the fact that there is insufficient power to the storage container is indicated by the activation of the lamp 32 attached to the outside front part of the refrigerator(step S26). When the power reception bit is not "power reception bit=1", this indicates that the power source 24 of the storage container control portion 22 is charged enough by keeping the power lamp 32 off (step 27).

In step S28, it is determined whether the halt command is inputted. When the answer is "yes", the second compressor 35 and the second heater 38 are turned off (step S29 and step S30). When the answer is "no", the process proceeds to step S2, so that the fermenting compartment is continuously controlled.

As described above, the present invention detects the temperature and the $CO_2$ concentration, the hydrogen ion concentration, and the gas pressure in the storage container located in the fermenting compartment and sends the data via radio waves to the refrigerator controller, so that inserting and removing the storage container is easy and the fermentation is accurately controlled.

What is claimed is:

1. A refrigerator, comprising:
  a case forming at least a fermentation compartment;
  a temperature regulating mechanism for regulating the temperature in the fermentation compartment;
  a storage container insertable into the fermentation compartment for storing fermenting food, the storage container including a detector for detecting fermentation conditions of fermenting food in the storage container, and a transmitter connected to the detector for transmitting a wireless signal representative of the detected fermentation conditions; and
  a refrigerator controller mounted in the case for receiving and processing the signal, the refrigerator controller connected to the temperature regulating mechanism for regulating the temperature in the fermentation compartment in accordance with the signal received from the transmitter.

2. A refrigerator according to claim 1, wherein the refrigerator controller includes a receiver for receiving the wireless signal and being disposed in the fermentation compartment.

3. A refrigerator according to claim 1, wherein the detector includes at least one of:
  a temperature sensor, a hydrogen ion concentration sensor, a $CO_2$ concentration sensor, and a gas pressure sensor.

4. A refrigerator according to claim 1, wherein the transmitter comprises a radio transmitter.

5. A refrigerator according to claim 1, wherein the case forms an additional compartment, the fermentation and additional compartments including a respective, independently controlled heat exchange means for regulation of the temperatures therein.

6. A storage container adapted for use in a refrigerator having at least a fermentation compartment, a temperature regulating mechanism for controlling the temperature within the fermentation compartment, and a signal receiver for receiving wireless signals and being connected to the temperature regulating mechanism, the storage container comprising:
  a detector for detecting a fermentation condition of fermenting food in the container; and
  a transmitter connected to the detector for transmitting a wireless signal representative of the detected fermentation conditions to the signal receiver.

7. A storage container according to claim 6, wherein the storage container includes a storage container controller connected to the transmitter for transmitting a signal only when there is a detected change in fermentation conditions.

8. A storage container according to claim 7 further including a lid in which the transmitter and storage container controller are disposed.

9. A storage container according to claim 8, wherein the lid further includes a detecting compartment wherein the detector is disposed.

10. A storage container according to claim 6, wherein the detector includes at least one of:
  a temperature sensor, a hydrogen ion concentration sensor, a $CO_2$ concentration sensor, and a gas pressure sensor.

11. A storage container according to claim 9, wherein the detecting compartment includes a wall having pores through which gases from the fermenting food passes.

12. A storage container according to claim 11, wherein the detector includes a hydrogen ion concentration detector disposed outside of the detecting compartment and connected to a wire which projects through a pore in the detecting compartment.

13. A storage container according to claim 6, wherein the transmitter constitutes a radio signal transmitter.

14. A refrigerator, comprising:
  a case forming at least a fermentation compartment adapted to receive a storage container which contains fermenting food and a transmitter for sending a wireless signal representative of fermentation conditions in the container;

a temperature regulating mechanism for controlling the temperature in the fermentation compartment; and a refrigerator controller connected to the temperature regulating mechanism and including a signal receiver for receiving a wireless signal from the transmitter to regulate the temperature in the fermentation compartment in accordance with the signal.

15. A refrigerator according to claim 14, wherein the receiver is a radio receiver for receiving a radio signal.

16. A refrigerator according to claim 14, wherein the case forms an additional compartment, the fermentation and additional compartments including a respective, independently controlled heat exchange means for regulation of the temperatures therein.

17. A method of controlling the fermentation of food in a refrigerator, comprising the steps of:

A) providing the refrigerator with at least a fermentation compartment;

B) placing in the fermentation compartment a storage container containing food to be fermented, the storage container including a detector for detecting the fermentation condition of the food, and a transmitter;

C) actuating the detector for detecting the fermentation condition of the food;

D) actuating the transmitter for transmitting a wireless signal representative of the detected fermentation condition; and E) causing a temperature regulating mechanism in the refrigerator to receive the wireless signal and control the temperature of the fermentation compartment in accordance with the wireless signal.

18. A method according to claim 17, wherein step D comprises transmitting a radio signal.

19. A method of controlling a refrigerator which includes at least a fermentation compartment, comprising the steps of:

A) detecting the fermentation condition of fermenting food disposed within a storage container placed within the fermentation compartment and comparing the detected condition with a reference condition;

B) controlling the temperature in the fermentation compartment in accordance with the result of the comparison in step A;

C) sensing a condition wherein a power supply in the storage compartment is insufficiently charged; and D) actuating an indicator indicating the condition sensed in step C.

20. A method according to claim 19, wherein step A comprises sensing at least one of: temperature, hydrogen ion concentration, $CO_2$ concentration, and gas pressure in the storage container.

* * * * *